(12) United States Patent
Ryu

(10) Patent No.: US 8,154,538 B2
(45) Date of Patent: Apr. 10, 2012

(54) DIFFERENTIAL SIGNALING SYSTEM AND FLAT PANEL DISPLAY WITH THE SAME

(75) Inventor: Jee-youl Ryu, Seoul (KR)

(73) Assignee: Samsung Mobile Display Co., Ltd., Yongin (KR)

(*) Notice: Subject to any disclaimer, the term of this patent is extended or adjusted under 35 U.S.C. 154(b) by 1128 days.

(21) Appl. No.: 11/971,408

(22) Filed: Jan. 9, 2008

(65) Prior Publication Data

US 2008/0211791 A1 Sep. 4, 2008

(30) Foreign Application Priority Data

Jan. 11, 2007 (KR) .................. 10-2007-0003361

(51) Int. Cl.
*G06F 3/038* (2006.01)
(52) U.S. Cl. .......................................... 345/204; 345/55
(58) Field of Classification Search .............. 345/55, 345/78, 101, 204–214; 326/82–87
See application file for complete search history.

(56) References Cited

U.S. PATENT DOCUMENTS

| | | | |
|---|---|---|---|
| 6,448,813 B2 | 9/2002 | Garlepp et al. | |
| 6,448,815 B1 * | 9/2002 | Talbot et al. | 326/86 |
| 6,894,436 B2 | 5/2005 | Togashi et al. | |
| 6,992,508 B2 | 1/2006 | Chow | |
| 7,067,743 B2 | 6/2006 | Tsukashima | |
| 7,236,018 B1 | 6/2007 | Wang et al. | |
| 7,595,661 B2 | 9/2009 | Kim | |
| 7,598,772 B2 * | 10/2009 | Young | 326/83 |
| 7,633,312 B2 | 12/2009 | Saeki | |
| 2004/0104903 A1 * | 6/2004 | You | 345/204 |
| 2005/0007393 A1 | 1/2005 | Akai et al. | |
| 2005/0239431 A1 | 10/2005 | Yamamoto et al. | |
| 2006/0071683 A1 | 4/2006 | Best et al. | |

FOREIGN PATENT DOCUMENTS

| | | |
|---|---|---|
| JP | 05-55898 A | 3/1993 |
| JP | 9-102763 | 4/1997 |
| JP | 10-290183 | 10/1998 |
| JP | 2004-112178 | 4/2004 |
| KR | 1999-66886 | 8/1999 |
| KR | 2000-74847 | 12/2000 |
| KR | 2005-113476 | 12/2005 |

OTHER PUBLICATIONS

Korean Notice of Allowance dated Dec. 21, 2007 for Korean Patent Application KR 10-2007-0003362 corresponding to U.S. Appl. No. 11/972,194, filed Jan. 10, 2008, which is related to the captioned application.

* cited by examiner

*Primary Examiner* — Alexander Eisen
*Assistant Examiner* — Christopher E Leiby
(74) *Attorney, Agent, or Firm* — Knobbe Martens Olson & Bear, LLP

(57) ABSTRACT

A differential signaling system where a first wire and a second wire are connected to a sending end and a receiving end of a differential signal line. A termination resistor is connected between the first wire and the second wire adjacent to the receiving end. A programmable compensation circuit is connected to the termination resistor in parallel. The programmable compensation circuit includes: a plurality of switches for receiving each bit of an input digital control signal through a gate thereof; a plurality of first capacitors including a first electrode connected to a source electrode of each of the switches, and a second electrode connected to the first wire; and a plurality of second capacitors including a first electrode connected to a drain electrode of each of the switches, and a second electrode connected to the second wire.

15 Claims, 7 Drawing Sheets

DIFFERENTIAL SIGNALING SYSTEM AND FLAT PANEL DISPLAY WITH THE SAME

CROSS-REFERENCE TO RELATED APPLICATION

This application claims the benefit of Korean Application No. 2007-3361, filed Jan. 11, 2007 in the Korean Intellectual Property Office, the disclosure of which is incorporated herein by reference.

BACKGROUND OF THE INVENTION

1. Field of the Invention

Aspects of the present invention relate to a flat panel display using a signal transmission method for transmitting a differential signal, and more particularly, to a flat panel display incorporating a differential signaling system for impedance matching in the signal transmission method.

2. Description of the Related Art

In general, a cathode ray tube (CRT) is one type of display device that has been widely used. CRTs have been used as monitors for television sets, measuring instruments, or information terminals. Because a CRT is heavy and large, it cannot be used when miniaturization or light weight are design requirements.

Accordingly, in order to substitute for a CRT, various flat panel displays such as a liquid crystal display (LCD), a plasma display panel (PDP), a field emission display (FED), and an organic light emitting display (OLED) have been developed. These have the advantages of miniaturization, light weight, and low electric power consumption.

As cited above, a flat panel display includes various components as well as wiring for transmitting signals among the various components. Recently, with the development of electronic circuit and manufacturing process technology, a signal can be transmitted through the wiring at high speed. To meet high speed signal transmission requirements, the drive speed of the components has also become high.

Accordingly, various methods for transmitting signals among the components and through the wiring have been suggested. For example, a signal transmission method such as a low voltage differential signal (LVDS) method or a reduced swing differential signaling (RSDS) method for transmitting a differential signal has been used.

A differential signaling system transmits a different mode signal having the same amplitude and a different polarity through a differential transmission line. Accordingly, there is a tendency to remove a concentrated magnetic field and to couple an electric field. Because of the coupled electric field, a high speed signal can be stably transmitted without a signal reflection or skewed (phase delay) electro magnetic interference (EMI).

A conventional flat panel display will be described with reference in detail to FIGS. 1-3. FIG. 1 is a block diagram showing the structure of a conventional flat panel display. As shown in FIG. 1, the conventional flat panel display includes a display panel 40, a gate driver 20, a data driver 30, and a controller 10. Pixels are arranged in the matrix of the display panel 40. The gate driver 20 sequentially applies a scan signal to gate wires of the display panel 40. The data driver 30 applies an image signal DATA1 to data wires of the display panel 40. The controller 10 applies the image signal DATA1 from an external graphic controller (not shown) to the data driver 30, and applies a control signal CS1 to the gate driver 20 and the data driver 30 in order to control drive timing. In the conventional flat panel display, after all gate wires of the display panel 40 are sequentially scanned and the image signal DATA1 is applied to pixels through the data wires to display one frame of an image, a vertical synchronous signal VSYNC is applied to display the next frame of the image.

FIG. 2 is a block diagram showing in detail the controller and the data driver of FIG. 1. FIG. 3 is a block diagram showing a signal transmission method between the controller and the data driver. As shown in FIG. 2, the data driver 130 is composed of a plurality of data driving circuits 132. The plurality of data driving circuits 132 receives image signals DATA [+,−] from the controller 110 through first and second wires W1 and W2, and receives a control signal CS11 from the controller 110 through a third wire W3.

The data driver 130 includes a plurality of data driving circuits 132 therein. The data driving circuits 132 receive image signals DATA [+,−] from the controller 110, and output them to the data wires in response to the control signal CS11 from the controller 110. Although they are not shown in drawings, a plurality of data wires are electrically coupled to the data driving circuits 132, and apply the image signals DATA [+,−] that were applied to the data driving circuits 132 to the pixels.

The image signal from the controller is transmitted to the respective data driving circuits in the conventional differential signal transmission method. That is, as shown in FIG. 3, in order to transmit one data group DATA [+,−], a differential transmission line arrangement, namely, first and second wires W1 and W2 are provided between the controller 110 shown as a sending end Tx and the data driving circuit 132 shown as a receiving end Rx.

Meanwhile, a termination resistor $R_t$ is installed between the differential transmission lines of the receiving end (data driving circuit 132). The termination resistor $R_t$ electrically connects the first wire W1 and the second wire W2 that are connected to each data driving circuit 132 to each other.

In this way, the image signal DATA [+] applied through the first wire W1 is transferred from the controller 110 through the termination resistor $R_t$ and the second wire W2. The termination resistor $R_t$ prevents excess current from flowing to the data driving circuit 132 while the voltage across the termination resistor $R_t$ is image signal DATA [+,−], which is applied to the data driving circuit 132.

A plurality of electric devices and wires are provided in the flat panel display, and are electrically coupled to each other. The electric devices and wires have an impedance component that attenuates the signal during signal transmission between the electric devices.

The controller 110 and the data driving circuits 132 also have an impedance component. Further, the first and second wires W1 and W2 for connecting the controller 110 and the data driving circuits 132 have an impedance component $Z_0$.

If the impedance value $Z_0$ of the first wires W1 and W2 is different from that of the data driving circuits 132, namely, when the impedances do not match, the image signals DATA [+,−] are not exactly supplied to the data driving circuits 132. That is, a portion of the image signals is reflected and discharged.

In detail, a reflection coefficient Γ is expressed by a following equation 1:

$$\Gamma = \frac{Z_{\mathit{diff}} - R_t}{Z_{\mathit{diff}} + R_t} \tag{1}$$

where the differential impedance $Z_{\mathit{diff}}$ is the sum of impedance values of the first and second wires, has a value less than $2Z_0$, and also has a different value depending on the manufacturing process and construction of the flat panel display.

Specifically, when the differential impedance $Z_{diff}$ is identical to the value of the termination resistor, a reflection loss of a signal does not occur. However, because the differential impedance $Z_{diff}$ varies, in the conventional case, impedance matching is not normally achieved in the differential transmission method.

Furthermore, when a reflection wave occurs due to impedance mismatching, electro-magnetic interference (EMI) with the image signals DATA [+,−] applied through the first wire W1 occurs and causes an unstable wave, signal distortion and attenuation. As a result, the EMI deteriorates image quality of the flat panel display.

SUMMARY OF THE INVENTION

Accordingly, an example embodiment of the present invention provides a differential signaling system and a flat panel display that precisely achieves impedance matching without any electro magnetic interference in order to stably transmit a high speed signal. This is done by compensating for a variation in differential impedance by a programmable compensation circuit in the flat panel display that uses a signal transmission method for transmitting a differential signal. The programmable compensation circuit is installed inside the data driving circuit at the receiving end and performs impedance matching in this differential signal transmission method.

The foregoing and/or other example embodiments and aspects of the present invention are achieved by providing differential signaling system comprising a first wire and a second wire connected to a sending end and a receiving end in a differential signal line; a termination resistor connected between the first wire and the second wire in the receiving end side; and a programmable compensation circuit connected to the termination resistor in parallel. The programmable compensation circuit includes: n switches M1, M2, . . . , Mn for receiving each bit of an input digital control signal through each gate thereof; n first capacitors C11, C12, . . . , C1n that include a first electrode connected to a source electrode for each of the switches, and a second electrode connected to the first wire; and n second capacitors C21, C22, . . . , C2n that include a first electrode connected to a drain electrode of each of the switches, and a second electrode connected to the second wire.

Another example embodiment of the present invention provides a flat panel display comprising: a display panel in which a plurality of data wires and gate wires are arranged to intersect each other; a controller to receive an image signal from an exterior source, generate a control signal, and output the image signal and the control signal through the first and second wires in a differential signal line; a gate driver to receive the control signal from the controller and apply a scan signal to the gate wires; and a plurality of data driving circuits that include a programmable compensation circuit connected to a termination resistor in parallel installed between the first and second wires for automatically controlling the impedance value of a data driving circuit corresponding to a differential impedance value within the differential signal line. Each of the data driving circuits includes a data driver for receiving an image signal and/or a control signal from the controller through the first and second wires and applies the image signal to the data wires. The programmable compensation circuit includes: n switches M1, M2, . . . , Mn for receiving each bit of an input digital control signal through each gate thereof; n first capacitors C11, C12, . . . , C1n that include a first electrode connected to a source electrode of each of the switches, and a second electrode connected to the first wire; and n second capacitors C21, C22, . . . , C2n that include a first electrode connected to a drain electrode of each of the switches, and a second electrode connected to the second wire.

Additional example embodiments, aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
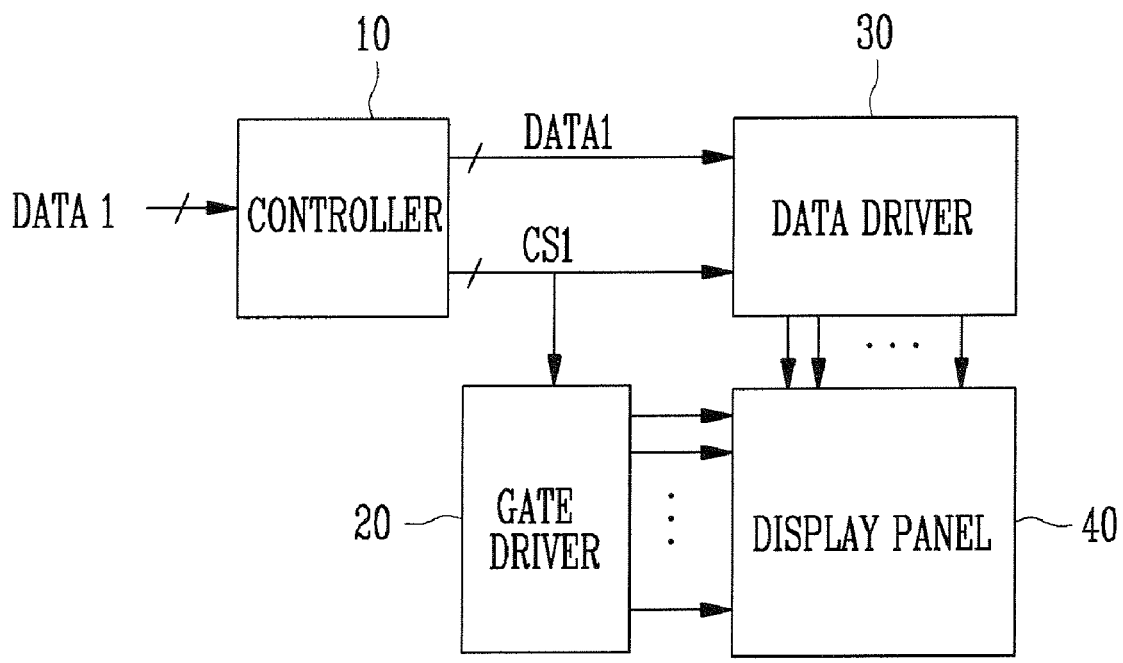
FIG. 1 is a block diagram showing the structure of a conventional flat panel display.
Figure 2:
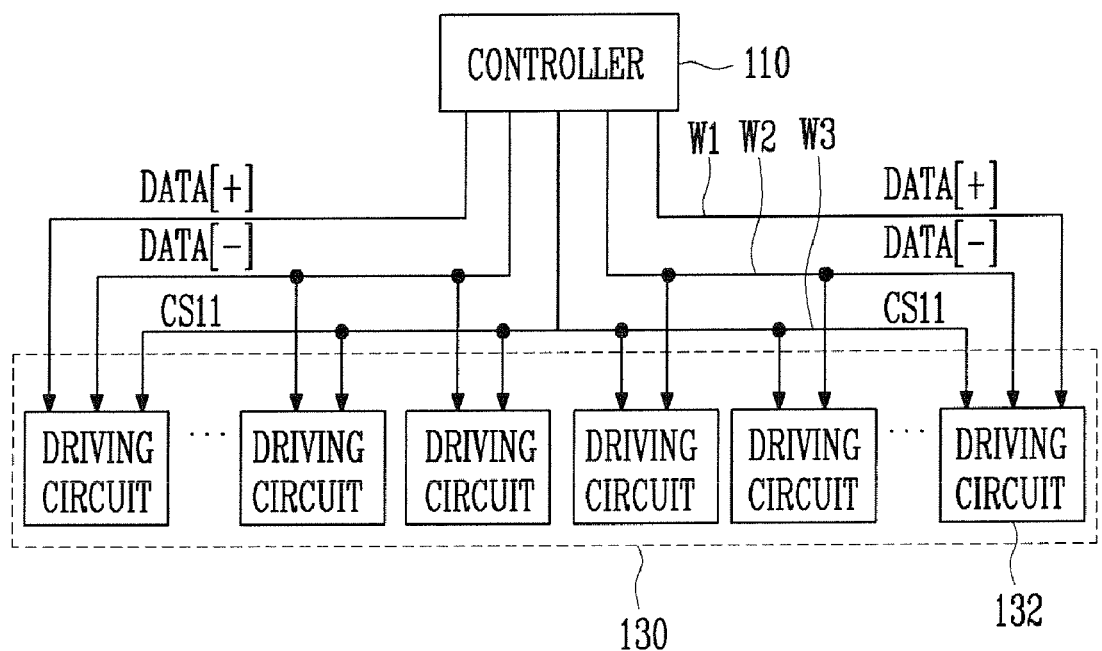
FIG. 2 is a block diagram showing a controller and a data driver of FIG. 1.
Figure 3:
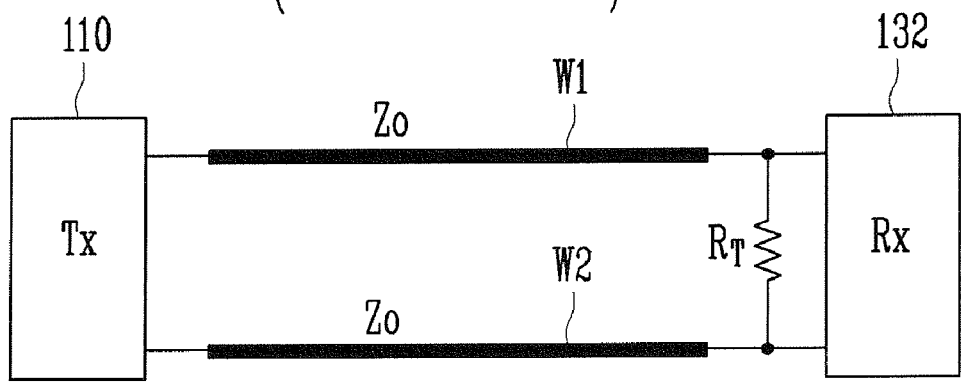
FIG. 3 is a block diagram showing a signal transmission method between the controller and the data driver of FIG. 2.

Reference will now be made in detail to the example embodiments of the present invention, examples of which are illustrated in the accompanying drawings, wherein like reference numerals refer to like elements throughout. The example embodiments are described below in order to explain the present invention by referring to the figures.

In these figures, when one element is coupled to a second element, the one element may not only be directly coupled to the second element but also indirectly coupled to a third element via the second element. Further, irrelevant elements are omitted for clarity.

Figure 4:
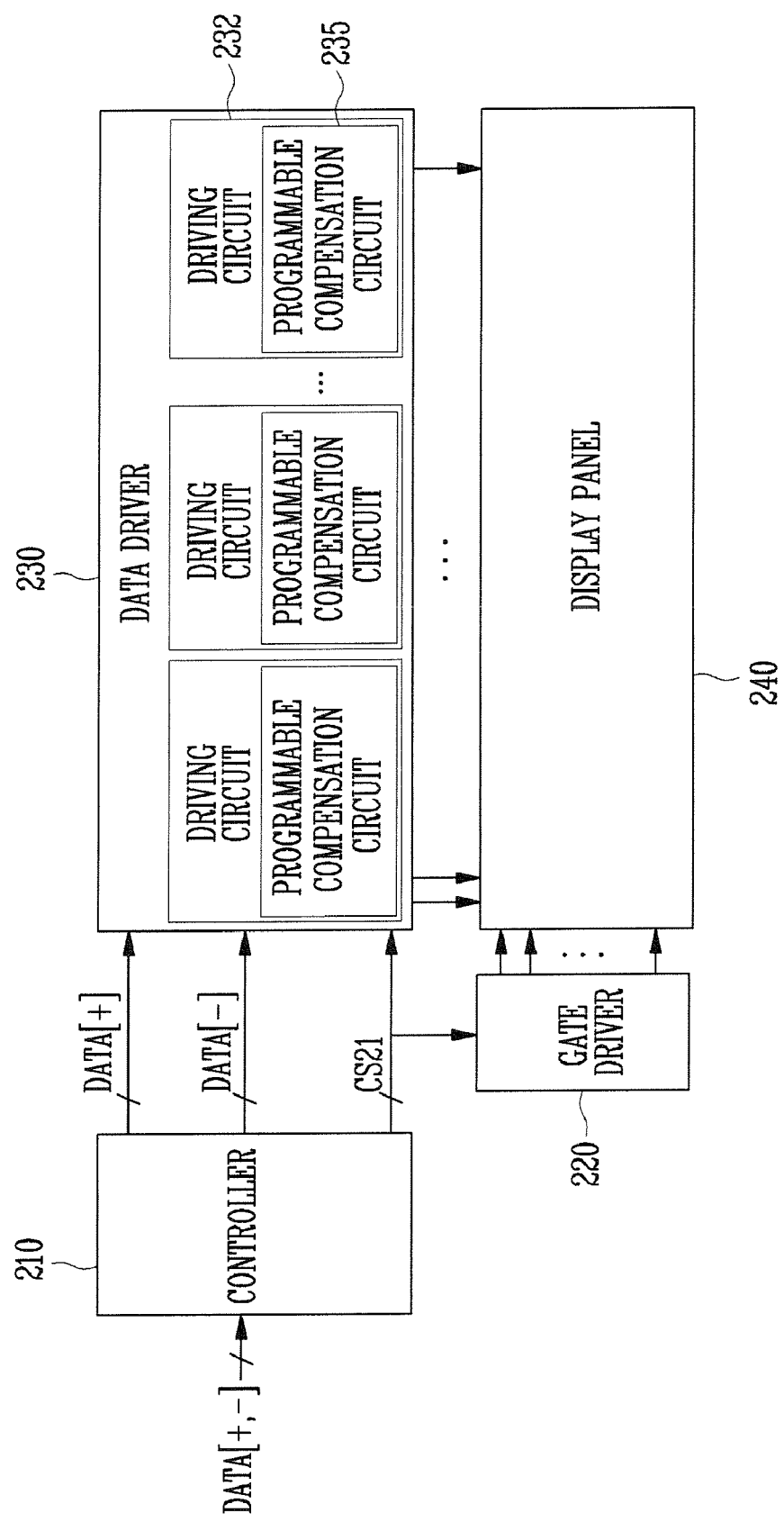
FIG. 4 is a block diagram showing the structure of a flat panel display according to an example embodiment of the present invention.

FIG. 4 is a block diagram showing the structure of a flat panel display according to an example embodiment of the present invention. As shown in FIG. 4, the flat panel display according to this example embodiment of the present invention includes a display panel 240, a gate driver 220, a data driver 230, and a controller 210. Gate wires and data wires are arranged to intersect each other in the display panel 240. The gate driver 220 sequentially applies a scan signal to gate wires of the display panel 240. The data driver 230 applies an image signal DATA [+,−] to data wires of the display panel 240. The controller 210 applies the image signal DATA [+,−] from an external graphic controller (not shown) to the data driver 230, and applies a control signal CS21 to the gate driver 220 and the data driver 230 in order to control drive timing.

Further, the flat panel display according to an aspect of the present invention is a flat panel display using a signal transmission method for transmitting a differential signal. A programmable compensation circuit 235 is installed inside each of a plurality of data driving circuits 232 at the receiving end, and in order to precisely achieve impedance matching compensates for any variation in the differential impedance In the display panel 240, a plurality of gate wires are arranged to be spaced apart from each other in the horizontal direction of FIG. 4, and a plurality of data wires are arranged to be spaced apart from each other in the vertical direction of FIG. 4. The gate wires and the data wires intersect each other to divide the display panel 240 into a plurality of regions. The regions are referred to as "pixels." The pixels are electrically coupled to the gate wires and the data wires, and are arranged on the display panel 240 in a matrix.

The controller 210 is a timing controller. The controller 210 receives image signals DATA [+,−] from outside of FIG. 4 and generates various control signals CS21 to drive the flat panel display. The controller 210 applies the image signals DATA [+,−] to the data driver 230, and applies the control signal CS21 to the gate driver 220 and the data driver 230 to control drive timing. Here, the controller 210 applies a vertical synchronous signal VSYNC, a horizontal synchronous signal HSYNC, a clock signal, a gate start signal, and a data output enable signal to the gate driver 220 and the data driver 230 as the control signal CS21 to control the drive timing of the gate driver 220 and the data driver 230.

That is, the controller 210 applies the horizontal synchronous signal HSYNC and the gate start signal to the gate driver 220 to sequentially apply a scan signal to the gate wires of the display panel 240. Further, the controller 220 applies the horizontal synchronous signal HSYNC, the data output enable signal, and the image signals DATA [+,−] to the data driver 230, so that the image signals DATA [+,−] are applied to pixels of the gate wiring to which the scan signal is applied. This causes the drive timing of the gate driver 220 and the data driver 230 to be controlled.

The data driver 230 is electrically coupled to the display panel 240 through the data wires. The data driver 230 is composed of a plurality of data driving circuits 232. Each of the data driving circuits 232 receives the image signals DATA [+,−] and the control signal CS21 from the controller 210, and outputs them to the data wires.

A programmable compensation circuit 235 is installed at input terminals of each data driving circuit 232. Here, the data driving circuit 232 receives the image signals DATA [+,−] from the controller 210. Any differential impedance between the impedance generated from the controller 210 to the data driving circuit 232 and the impedance of the data driving circuit 232 are equally matched so that the image signals DATA [+,−] from the controller 210 are easily supplied.

Moreover, the gate driver 220 receives a control signal CS21 from the controller 210, and sequentially applies a scan signal to the gate wires to drive pixels arranged in a matrix with the scan wires. The data driver 230 applies the image signals DATA [+,−] to the pixels to which the scan signal is applied through the data wires.

Through the aforementioned operation, after all gate wires of the display panel 240 are sequentially scanned and the image signals DATA [+,−] are applied to the pixels through the data wires to display one frame of an image, the vertical synchronous signal VSYNC is applied to display the next frame of the display panel 240.

Figure 5:
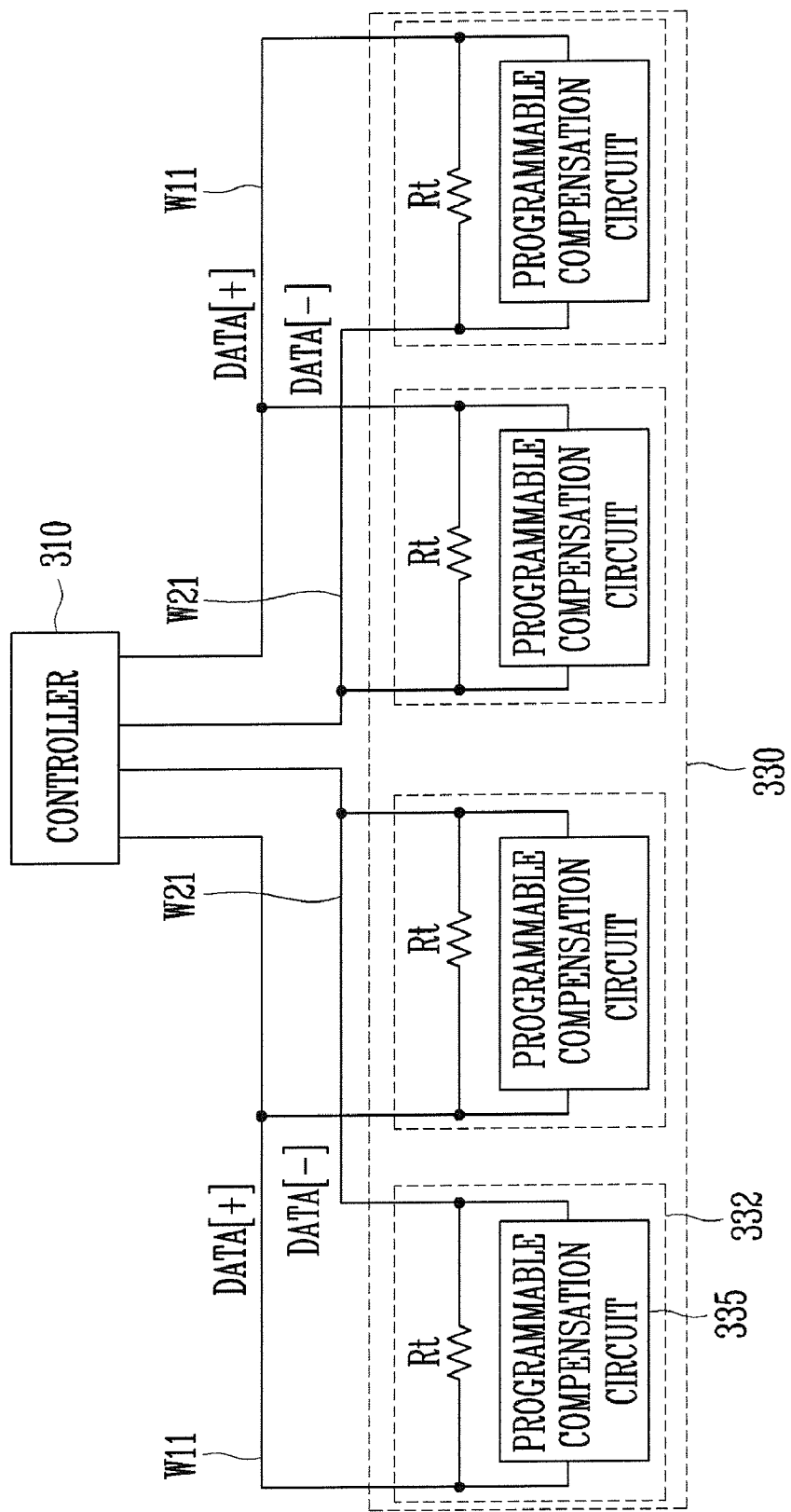
FIG. 5 is a detailed block diagram showing an aspect of a controller and a data driver shown in FIG. 4.
Figure 6:
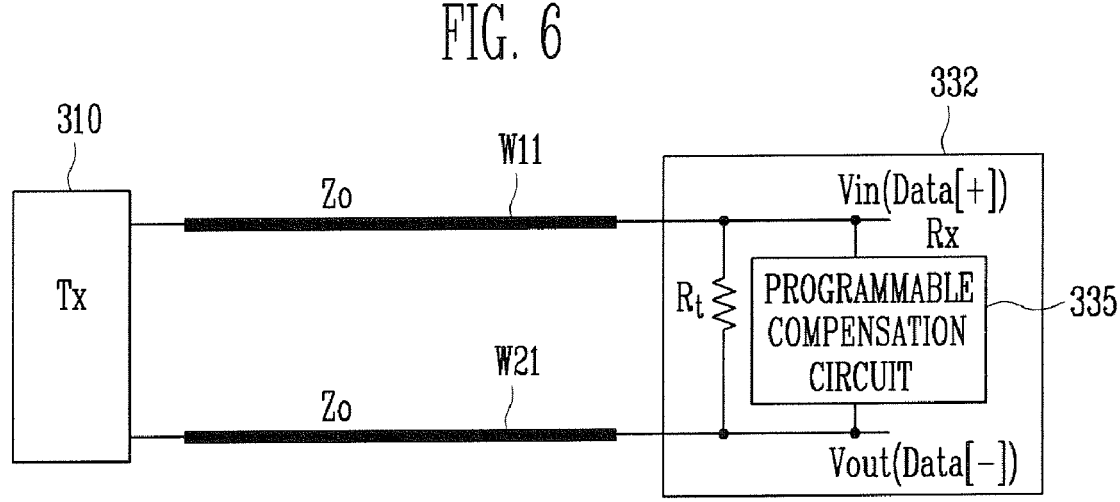
FIG. 6 is a block diagram showing a differential signaling system according to an example embodiment of the present invention.
Figure 7:
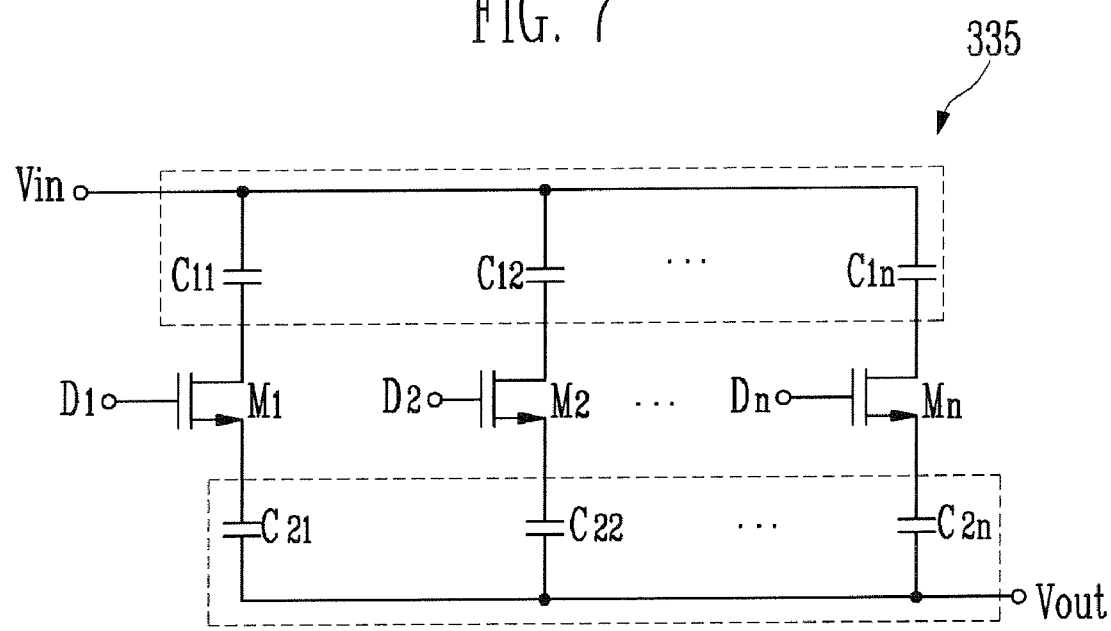
FIG. 7 is a detailed circuitry diagram of a programmable compensation circuit.

The following figures illustrate the detailed structure and operation of the programmable compensation circuit. FIG. 5 is a detailed block diagram of the controller and the data driver shown in FIG. 4. FIG. 6 is a block diagram showing a differential signaling system according to an aspect of the present invention. That is, FIG. 6 is a view illustrating a signal transmission method between the controller and the data driver shown in FIG. 5. FIG. 7 is a detailed circuitry diagram of a programmable compensation circuit.

As shown in FIG. 5, the flat panel display according to this example embodiment of the present invention includes a controller 310 and a data driver 330. The controller 310 receives the image signals DATA [+,−] from an exterior source outside of the scope of this disclosure and applies the image signals to the first and second wires W11 and W21. The data driver 330 includes a plurality of data driving circuits 332. The plurality of data driving circuits match impedance with the exterior signal, and receive the image signals DATA [+,−] from the controller 310 through the first and second wires W11 and W21.

The controller 310 and the data driving circuits 332 transmit the image signals and the control signal, for example, by a low voltage differential signaling (LVDS) transmission method, which transmit signals at high speed. That is, the controller 310 is electrically connected to the data driver 330 through the first and second wires W11 and W21. The data driver 330 includes a plurality of data driving circuits 332. Each of the data driving circuits 332 receives the image signals DATA [+,−] from the controller 310 through the first and second wires W11 and W21. However, for convenience of description, the wiring for supplying a control signal (e.g., CS21 in FIG. 4) is omitted in FIG. 5. Further, a pair of first and second wires W11 and W21 is connected to each data driving circuit 332. However, in practice, plural pairs of the first and second wires W11 and W21 can be connected to each data driving circuit 332.

The first and second wires W11 and W21 are connected to the data driving circuit 332, and the first and second wires W11 and W21 are electrically connected through a termination resistor $R_t$ to form a closed circuit. Accordingly, the image signals DATA [+,−] applied from the controller 310 are applied to the termination resistor $R_t$ as a voltage. The termination resistor $R_t$ prevents any excess current from flowing to the data driving circuit 332, and applies a constant voltage from the image signals DATA [+,−] to the data driving circuit 332.

Specifically, as shown in FIG. 6, in order to transmit one data group DATA [+,−], a differential transmission line arrangement, namely, first and second wires W11 and W21 is provided between the controller 310 that is the sending end Tx and the data driving circuit 332 that is the receiving end Rx. A termination resistor $R_t$ is provided between the differential transmission lines of the data driving circuit 332 that is the receiving end. The termination resistor $R_t$ electrically connects the first and second wires W11 and W21 connected to each data driving circuit 332 to form a closed circuit.

As described earlier, when only the termination resistor $R_t$ is connected between the differential transmission lines, since the differential impedance $Z_{diff}$ can vary due to external factors, the impedances do not normally match in the differential transmission method. In order to solve the problem, in the example embodiment of the present invention, the programmable compensating circuit 335 is connected to the termination resistor $R_t$ in parallel. Through the programmable compensating circuit 335, the impedance value of the receiving end, namely, the data driving circuit 332 that corresponds to the differential impedance value is automatically controlled, so that more exact impedance matching can be obtained.

In a differential signaling system according to the example embodiment of the present invention shown in FIG. 6 a reflection coefficient Γ in a system including the programmable compensation circuit 335, is expressed by the following equation 2:

$$\Gamma = \frac{\overline{Z_{diff}} - Z_{TN}}{\overline{Z_{diff}} + Z_{TN}} \quad (2)$$

Furthermore, the parallel composite impedance $Z_{TN}$ is expressed by the following equation 3:

$$Z_{TN} = \frac{NR_t}{N + j\omega R_t C_b} = \frac{N^2 R_t}{N^2 + (\omega R_t C_b)^2} - j\omega \frac{NR_t^2 C_b}{N^2 + (\omega R_t C_b)^2} \quad (3)$$

where, N is the bit number of a digital control signal inputted to the programmable compensation circuit 325, $R_t$ represents a terminal resistance, and $C_b$ represents the capacitance of the programmable compensation circuit 335.

The differential impedance $\overline{Z_{diff}}$ is a value less than $2Z_0$, which is the sum of impedance values of the first and second wires W11 and W21. The differential impedance can vary according to the manufacturing process and the arrangement of the flat panel display. As illustrated in equation 3, since the value of $Z_{TN}$ varies depending on the operation of the programmable compensation circuit 335, the variation of the differential impedance can be compensated. That is, the programmable compensation circuit 335 operates so that the size of $Z_{TN}$ is identical with $\overline{Z_{diff}}$, such that the reflection coefficient becomes zero, thereby eliminating any reflection loss of the signal.

Since the programmable compensation circuit 335 is connected to the termination resistor $R_t$ in parallel, exact impedance matching occurs even with a differential impedance value between the first and second wires W11 and W21 coupled with the data driving circuit 332. Accordingly, the image signals DATA [+,−] applied through the first and second wires W11 and W21 are not reflected, and there is no adverse effect on the image signals DATA [+,−] a part of which is otherwise lost or distorted by a reflecting wave. Thus, electro magnetic interference (EMI) that would otherwise be applied to the data driving circuits 332 is prevented. Accordingly, since the image signals DATA [+,−] retain a stable wave from the controller 310 and are easily applied to the data driving circuit 332, deterioration of image quality of the flat panel display is prevented.

The structure of the programmable compensation circuit 335 will be explained referring to FIG. 7. As shown in FIG. 7, the programmable compensation circuit 335 includes n switches M1, M2, . . . , Mn; n first capacitors C11, C12, . . . , C1n; and n second capacitors C21, C22, . . . , C2n. The n switches M1, M2, . . . , Mn receive each bit of an input digital control signal through each gate thereof. A first electrode of the n first capacitors C11, C12, . . . , C1n is connected to a source electrode of each switch, and a second electrode thereof is connected to the first wire. A first electrode of the n second capacitors C21, C22, . . . , C2n is connected to a drain electrode of each switch, and a second electrode thereof is connected to the second wire.

Here, the number of each switch M1, M2, . . . , Mn, is the digital bit number of a control signal for controlling the programmable compensation circuit 335. When the programmable compensation circuit 335 operates with 8 bits, the n becomes 8. That is, each switch M1, M2, . . . , Mn, receives the respective bit of the input digital control signal and is turned on or off according thereto. Hereinafter for purposes of explanation, it is assumed that the programmable compensation circuit operates by an 8 bit control signal.

Each switch M1, M2, . . . , Mn, can be a transistor. It is preferred that the transistor has a layout with a minimum distributed gate resistance so as to minimize any effect from thermal noise. Further, it is preferred that the transistor be designed to be operated in a deep triode region so as not to have any DC offset between input and output voltages.

Furthermore, the first n capacitors C11, C12, . . . , C1n; and the second n capacitors C21, C22, . . . , C2n have the same capacitance (2/n) $C_b$. In the aspect mentioned above, $C_b$ represents the capacitance value of the programmable compensation circuit 335. However, the present invention is not limited thereto. In this aspect, when the programmable compensation circuit operates with 8 bits, there are 8 first capacitors C11, C12, . . . , C18 and 8 second capacitors C21, C22, . . . , C28, each of which has the value (¼) $C_b$.

Figure 8A:
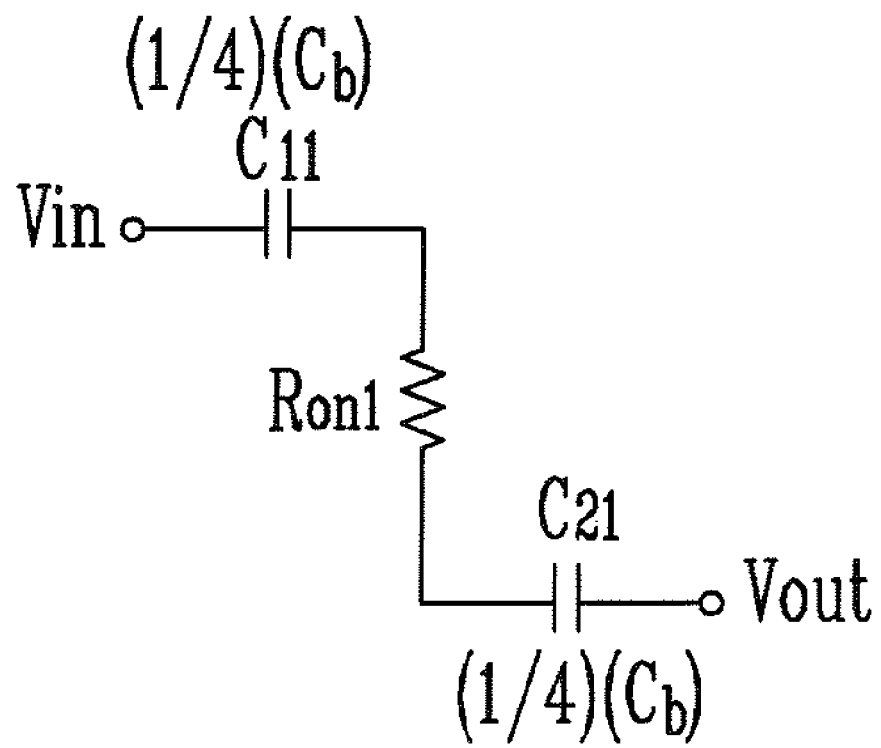
FIGS. 8A through 8D are diagrams illustrating operation of the programmable compensation circuit shown in FIG. 7.

FIGS. 8A through 8D are diagrams for demonstrating the operation of the programmable compensation circuit 335 shown in FIG. 7. First, FIG. 8A shows an alternating current equivalent circuit when the 8 bit control signals D8, D7, . . . , D1 that are inputted to the programmable compensation circuit 335 are (0, 0, . . . , 1), that is, in a state that only the switch M1 among the switches is turned on and the remaining switches are turned off.

Here, the first capacitor C11 and the second capacitor C12 have a capacitance of (¼) $C_b$. It is assumed that the resistor shown, Ron1, is the turned on resistance of the switch M1, and has a very small value. Therefore, the voltage drop in the resistor Ron1 having a very small resistance value can be disregarded.

$$Ron1, \ldots, Ron8 \ll 1/\omega C_b \quad (4)$$

Figure 8B:
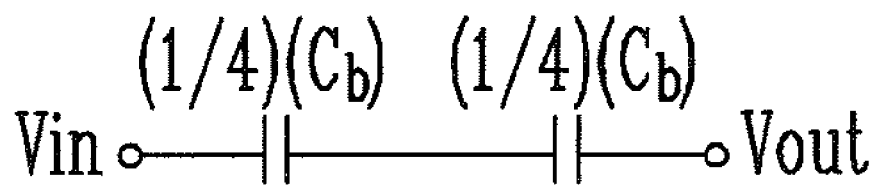
Figure 8C:
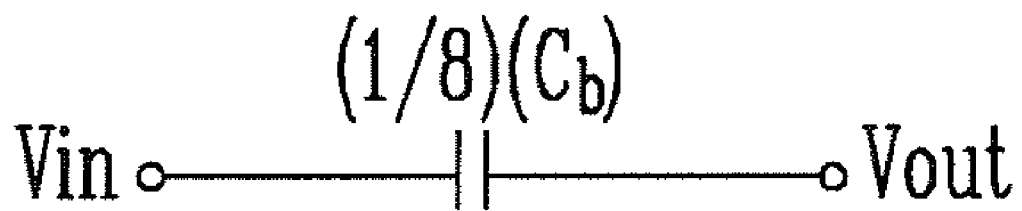

As a result, the alternating current equivalent circuit of FIG. 8A can be expressed by the equivalent circuit shown in FIG. 8B. Then, as shown in FIG. 8C, the alternating current equivalent circuit of FIG. 8A has a capacitance value of (⅛) $C_b$ as is the case when capacitors are connected in series. That is, when a control signal of (0, 0, . . . , 1) is inputted to the programmable compensation circuit 335, the resistance value of the programmable compensation circuit becomes (⅛) $C_b$.

Figure 8D:
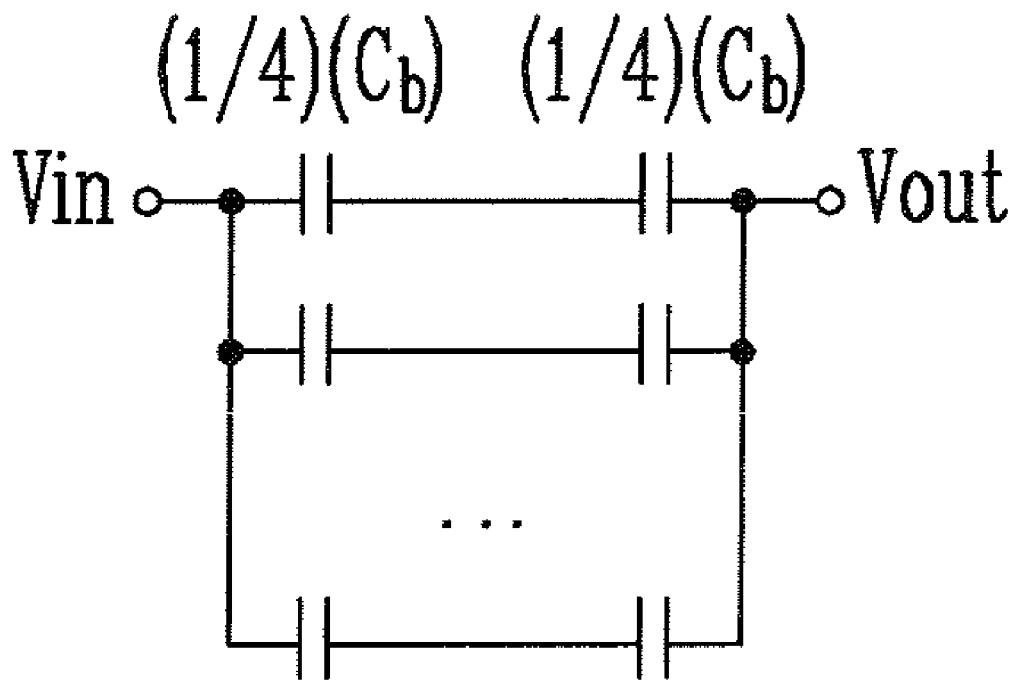

By similar logic, when the control signal (D8, D7, . . . , D1) is (1,1, . . . , 1), namely, when all eight switches M1, M2, . . . , M8 are turned-on, the alternating current equivalent circuit of FIG. 8A is expressed by an alternating current equivalent circuit as shown in FIG. 8D. The alternating current equivalent circuit of FIG. 8A has a capacitance value of $C_b$ by as is the case when each series pair of capacitors C11 and C21, C12 and C22, . . . , C18 and C28 is connected in parallel. Now, when the control signal of (1, 1, . . . , 1) is inputted to the programmable compensation circuit 335, the capacitance value of the programmable compensation circuit 335 becomes $C_b$.

As mentioned earlier, in the programmable compensation circuit 335, since the resistance value is adjusted according to the input control signal of n bits, as illustrated in the equation 3, it can be controlled so that the parallel composite impedance $Z_{TN}$ is identical in size to $\overline{Z_{diff}}$. In this case, the reflection coefficient becomes zero, thus eliminating reflection loss of the signal.

As explained above, the programmable compensation circuit 335 is connected to a termination resistor $R_t$ included in each data driving circuit 332. Accordingly, exact impedance matching occurs even with a differential impedance value from the first and second wires W11 and W21, which are coupled to the data driving circuit 332. Accordingly, the image signals DATA [+,−] applied through the first and second wires W11 and W21 are not reflected, and there is no adverse effect on the image signals DATA [+,−] a part of which is lost or distorted by a reflecting wave. Thus, electro magnetic interference (EMI) that would otherwise be applied to the data driving circuits 332 is prevented. Accordingly, since the image signals DATA [+,−] retain a stable wave from the controller 310 and are easily applied to the data driving circuit 332, deterioration of the image quality of the flat panel display is prevented.

That is, in the example embodiment of the present invention, in a flat panel display using a signal transmission method for transmitting a differential signal, a programmable compensation circuit 335 may precisely achieve impedance matching without electro magnetic interference in order to stably transmit a high speed signal by compensating for variations of differential impedance. That is, in a differential signal transmission method, a programmable compensation circuit 335 is installed inside the data driving circuit 332 that is at the receiving end of a data signal and matches impedances.

Although a few embodiments of the present invention have been shown and described, it would be appreciated by those skilled in the art that changes might be made in these embodiments without departing from the principles and spirit of the invention, the scope of which is defined in the claims and their equivalents.

What is claimed is:

1. A differential signaling system comprising:
a first wire and a second wire connected to a sending end and a receiving end as a differential signal line;
a termination resistor connected between the first wire and the second wire adjacent to the receiving end; and
a programmable compensation circuit connected to the termination resistor in parallel and configured to match an impedance of the first and second wires, wherein the programmable compensation circuit includes:
n switches M1, M2, . . . , Mn for receiving each bit of an input digital control signal through a plurality of gates thereof,
n first capacitors C11, C12, . . . , C1n including a first electrode connected to a source electrode of each of the switches, and a second electrode connected to the first wire, and
n second capacitors C21, C22, . . . , C2n including a first electrode connected to a drain electrode of each of the switches, and a second electrode connected to the second wiring, wherein the resistance of each of the n switches is not included in determining parallel composite impedance of the programmable compensation circuit.

2. The differential signaling system as claimed in claim 1, wherein the number of the switches is equal to the number of digital bits of a control signal for controlling the programmable compensation circuit.

3. The differential signaling system as claimed in claim 1, wherein each switch is a transistor having a minimum distributed gate voltage.

4. The differential signaling system as claimed in claim 1, wherein each of the first n capacitors C11, C12, . . . , C1n; and each of the second n capacitors C21, C22, . . . , C2n have the same capacitance of (2/n) Cb, and wherein Cb is the effective capacitance value of the programmable compensation circuit.

5. The differential signaling system as claimed in claim 1, wherein the composite impedance of the n first capacitors and the n second capacitors is matched to the total impedance of both the first and second wires.

6. A flat panel display comprising:
a display panel in which a plurality of data wires and gate wires are arranged to intersect each other;
a controller configured to receive an image signal from an exterior source and generate a control signal, output the control signal, and output the image signal through the first and second wires as a differential signal line;
a gate driver configured to receive the control signal from the controller and apply a scan signal to the gate wires; and
a plurality of data driving circuits, each data driving circuit including a programmable compensation circuit connected to a termination resistor in parallel installed between the first and second wires, the programmable compensation circuit configured to automatically match the impedance of the data driving circuit to a differential impedance value of the differential signal line, each of the data driving circuits including a data driver to receive an image signal and/or a control signal from the controller through the first and second wires and applying the image signal to the data wires, wherein the programmable compensation circuit includes:
n switches M1, M2, . . . , Mn to receive each bit of an input digital control signal through a plurality of gates thereof,
n first capacitors C11, C 12, . . . , C1n including a first electrode connected to a source electrode of each of the switches, and a second electrode connected to the first wire, and
n second capacitors C21, C22, . . . , C2n including a first electrode connected to a drain electrode of each of the switches, and a second electrode connected to the second wire, wherein the resistance of each of the n switches is not included in determining parallel composite impedance of the programmable compensation circuit.

7. The flat panel display as claimed in claim 6, wherein the number of the switches is equal to the number of digital bits of the control signal to control the programmable compensation circuit.

8. The flat panel display as claimed in claim 6, wherein each switch is a transistor having a minimum distributed gate voltage.

9. The flat panel display as claimed in claim 6, wherein each of the first n capacitors C11, C12, . . . , C1n; and each of the second n capacitors C21, C22, . . . , C2n have the same capacitance of (2/n) Cb, and wherein Cb is the effective capacitance value of the programmable compensation circuit.

10. The flat panel display as claimed in claim 6, wherein the composite impedance of the n first capacitors and the n second capacitors is matched to the total impedance of both the first and second wires.

11. A method of matching impedances in a flat display panel comprising a display panel, a plurality of data wires, a controller, a data driver and a plurality of data driving circuits within the data driver each data driving circuit including a programmable compensation circuit connected in parallel to a termination resistor, the method comprising:
receiving an image signal by the controller;
outputting the image signal from the controller through a pair of the plurality of data wires as a differential signal line to the plurality of data driving circuits including the respective programmable compensation circuit connected in parallel to a respective termination resistor;
automatically matching the impedance value of each data driving circuit to correspond to a differential impedance value in the differential signal line through a series of switches and capacitors in the respective programmable compensation circuit; and transmitting the image signal to the flat display panel, wherein each programmable compensation circuit includes:

n switches M1, M2, ..., Mn for receiving each bit of the image signal through a plurality of gates thereof, n first capacitors C11, C12, ..., C1n including a first electrode connected to a source electrode of each of the switches, and a second electrode connected to a first wire of the pair of data wires, and n second capacitors C21, C22, ..., C2n including a first electrode connected to a drain electrode of each of the switches, and a second electrode connected to a second wire of the pair of data wires, wherein the resistance of each of the n switches is not included in determining parallel composite impedance of the programmable compensation circuit.

12. The method of matching impedances in the flat display panel of claim 11, comprising a plurality of gate wires and a gate driver, the method further comprising: generating a control signal in the controller; receiving the control signal by the gate driver; and applying a scan signal from the gate driver to the scan wires, wherein the number of switches in each programmable compensation circuit is equal to the number of digital bits in the control signal to control each programmable compensation circuit.

13. The method of matching impedances in the flat display panel of claim 11, wherein each switch is a transistor having a minimum distributed gate voltage.

14. The method of matching impedances in the flat display panel of claim 11, wherein each of the first n capacitors C11, C12, ..., C1n; and each of the second n capacitors C21, C22, ..., C2n have the same capacitance of (2/n) Cb, and wherein Cb is the effective capacitance value of the programmable compensation circuit.

15. The method of matching impedances in the flat display panel of claim 11, wherein the composite impedance of the n first capacitors and the n second capacitors is matched to the total impedance of both the first and second wires.

* * * * *